United States Patent
Lupu

(10) Patent No.: US 7,412,706 B2
(45) Date of Patent: *Aug. 12, 2008

(54) INPUT REDIRECTION

(75) Inventor: Corneliu I. Lupu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 800 days.

This patent is subject to a terminal disclaimer.

(21) Appl. No.: 10/719,376

(22) Filed: Nov. 21, 2003

(65) Prior Publication Data

US 2004/0100480 A1 May 27, 2004

Related U.S. Application Data

(63) Continuation of application No. 09/544,514, filed on Apr. 6, 2000, now Pat. No. 6,721,950.

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................... 719/313; 715/764

(58) Field of Classification Search ......... 715/700–862; 719/310–320, 328–330
See application file for complete search history.

(56) References Cited

U.S. PATENT DOCUMENTS

| 5,455,904 | A | * | 10/1995 | Bouchet et al. | 715/798 |
|---|---|---|---|---|---|
| 5,619,639 | A | * | 4/1997 | Mast | 715/798 |
| 5,832,266 | A | * | 11/1998 | Crow et al. | 719/316 |
| 5,874,960 | A | * | 2/1999 | Mairs et al. | 715/733 |
| 5,898,419 | A | | 4/1999 | Liu | |
| 6,252,595 | B1 | * | 6/2001 | Birmingham et al. | 715/803 |
| 6,298,422 | B1 | | 10/2001 | Spilo et al. | |
| 6,686,936 | B1 | * | 2/2004 | Nason et al. | 715/778 |
| 2002/0057295 | A1 | * | 5/2002 | Panasyuk et al. | 345/804 |

* cited by examiner

*Primary Examiner*—Meng-Ai An
*Assistant Examiner*—Diem K Cao
(74) *Attorney, Agent, or Firm*—Christensen O'Connor Johnson Kindness PLLC

(57) ABSTRACT

A computer method for redirecting input messages to an application that has at least one window redirected is provided. The method intercepts input messages, determines if the input messages are directed at the redirected application, and transforms the input messages to correspond to the actual location of the window that has been redirected before the input message is redirected to the application that has had at least one of its windows redirected.

9 Claims, 6 Drawing Sheets

INPUT REDIRECTION

CROSS-REFERENCE TO RELATED APPLICATION

This application is a continuation of application Ser. No. 09/544,514, filed Apr. 6, 2000, now U.S. Pat. No. 6,721,950 priority from the filing date of which is hereby claimed under 35 U.S.C. §120.

FIELD OF THE INVENTION

The present invention relates to software, and more specifically, to redirecting messages received from input devices.

BACKGROUND OF THE INVENTION

In today's multi-tasking environments, users generally interact with computers through graphical user interfaces. Typically, these graphical user interfaces display an application's content within graphical windows on a display screen. Although multiple graphical windows can arise from a single program on a computer, the usual display screen includes windows from different programs executing independently of each other on the computer, or even several different computers.

With the development of faster computers having better graphical and multi-tasking capabilities, users may display a large number of windows on a desktop at any one time causing some windows on the display to overlap or obscure other windows. In order to view the obscured information, a user may resize or move the obstructing windows. This, however, may result in perhaps only seeing a portion of the desired information. Larger screen sizes and multiple monitors have been used to get around such a problem, but they are very expensive and can take up much desktop space. What is needed are new ways of interacting with windows in graphical user interfaces.

Typically, a user interacts with windows through various input devices, including a keyboard and a pointer device, such as a mouse. Many windowing systems provide mouse information to an application when the mouse pointer is located within an application's window boundary. Additionally, many applications rely on the mouse pointer being within its boundaries when manipulating the window by moving, resizing, selecting menu items, and the like. For example, the user may open a menu by locating the mouse pointer over a graphical menu and selecting the menu. As long as the mouse pointer remains over the menu, the menu will be visible. If the mouse pointer is moved outside of the menu's boundaries, however, the menu may disappear because the application assumes that the user is no longer interested in the menu.

Currently, there is no way of interacting with a graphical representation of a window as though the representation was a window object itself. While a user can apply transformations and effects to images on graphical displays, the user is not able to manipulate the graphical display through standard graphical user interface techniques. Accordingly, there is a need for a system and method for redirecting input so that a user may manipulate graphical images as if those images were window objects themselves.

SUMMARY OF THE INVENTION

The present invention is directed to providing a system and method for redirecting messages received from input devices. This redirection helps a user to interact with a graphical image as if the image itself was an actual application window. In one embodiment of the present invention, a window is redirected to appear as a texture map image on the user's display, rather than as an actual window object. When a window is redirected, the actual window object is not displayed to the user. Instead, to the user, the texture map image appears and interacts as though it was the actual window object of the application that has been redirected while the actual window object is hidden from the user. The operating system, however, does not recognize a texture map image, i.e., a textured polygon as a window object, and therefore, input events that are directed toward the texture map image may not correspond with the actual location of the redirected window. Therefore, input messages received from input devices are redirected to correspond to the actual location of the window object of the redirected application. For example, when a window has its output redirected to a three-dimensional (3D) display, instead of being displayed in a standard graphical window environment, the input messages received within the 3D environment are transformed to correspond to the two-dimensional (2D) screen location of the actual window object. If the input messages are properly redirected to correspond to the actual window location, the user will be able to manipulate the texture map image as though it was the actual window. For example, the user can type in the 3D window, adjust the menus, and interact with the redirected output as though the application had not been redirected. If the input were not redirected, the 3D image would not behave as the application window. Instead, the input messages directed at the application may not even be processed by the application that has had a window redirected; or processed incorrectly. In summary, in accordance with this invention, messages arriving from input devices belonging to a particular application are redirected to correspond to the actual location where the application is located on the desktop.

One embodiment of the invention works in the following way. Applications are provided with the ability to set a style bit indicating that a window should be redirected. The application redirecting the window is referred to as the redirection host. Any time after the window has been created, the redirection host may set the style bit. Once the style bit has been set, the graphics device interface (GDI) visually removes the window from the desktop, creates an off-screen bitmap, and reroutes all further drawing operations applied to the window to the redirected location. Since the redirected application may not be aware of this change, the redirection host is responsible for propagating changes in the application's visible appearance on the screen. To enable these changes, the GDI provides a global event (redirected paint) whenever the application has finished a visual update. By requesting a hook on this event, the redirection host obtains notification of the update, including which window was updated and the affected region within the window. Similarly, in order for the user to interact with the redirected output, input messages directed at the redirected window must often be transformed to correspond to the actual location of the window object. In one embodiment of the invention, a window test hook and get cursor position hook allows the operating system to intercept and change specified input messages to correspond to the actual screen location of the window object so that the application behaves as if it was not redirected.

In one embodiment of the invention, if a window has been redirected, the input messages obtained from the keyboard automatically go to the foreground application. The ability to bypass sending keyboard messages to the redirection host is achieved by setting a window flag to ensure that the redirection host does not become activated. Once the flag has been set the redirection host never receives keyboard messages because these are sent to the foreground application by the operating system. In one actual embodiment, therefore, the existing notions and policies of window activation and keyboard focus are consistent with the Windows operating system.

Mouse messages, on the other hand, typically get posted to the queue of the window that is located under the position of the cursor. Therefore, if the redirection style bit is detected as being set, a window hit test hook is installed that intercepts input messages before they are sent to the underlying window. If the mouse pointer is located over a redirected window's texture map, the mouse coordinates are adjusted and the target window handle in the hit test structure is updated such that the pointer will appear to redirected window to be in the proper location. Once the input message has bee examined, and possibly transformed, the operating system posts the message to correct application. If the message was a mouse click over a texture map representing a redirected window, the application will become a foreground application and update its visuals and behavior accordingly. Thus, a click on a window object causes a corresponding application to receive activation and focus; a click on the 3-D scene background causes the redirection host to receive focus. This occurs even though neither mouse nor keyboard messages actually reach the host window event queue. If the input event is determined to be outside of a redirected window then the input event message is left alone and no changes are made.

Input messages relating to mouse position are also adjusted when a redirected window inspects the mouse position directly. Therefore, an additional hook is provided that intercepts direct inquiries to obtain the cursor position made by an application that has had a window redirected. This hook updates the mouse coordinates so as to correspond to the actual location of the redirected window if the cursor is over a position of the redirected window's texture map.

In order for input redirection to properly work in one actual embodiment, each low-level mouse message generated in the system is inspected. Depending on how the output is redirected determines how difficult the hit test becomes. For example, when the output is redirected to a three-dimensional screen, the 3-D hit test can be non-trivial. It will appreciated, however, that deciding whether or not the pointer is over a pixel belonging to a redirected window can be accomplished in many different ways. For example, if the output is redirected to a 3-D scene, a 3-D hit test using hierarchical bounding boxes which returns a 2-D normalized coordinate on the face of the bounding box that was hit can be used. The normalized 2-D coordinate is then transformed into an appropriate pixel coordinate in the window's coordinate system. A map of the screen locations of transformed 3-D objects representing windows can also be created, allowing a simple point in polygon test to determine whether the mouse is over that window. By inverting and caching the 3-D camera transform, the transformation to 2-D forged coordinates becomes much cheaper computationally than ray-plane intersection against a bounding box.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to providing a computer method and system for redirecting messages received from input devices. More specifically, the invention is ideally suited for use in redirecting input messages to applications that have had a window's output redirected. Output redirection refers to windows that have had their graphical drawing redirected. For example, an output redirected window may appear as a three-dimensional texture map object instead of being displayed in the typical two-dimensional representation as is standard in many windows operating systems, such as Windows 98, Windows NT, and X Windows. Output redirection can better be understood by referring to co-pending patent application Ser. No. 09/282,872, filed Mar. 31, 1999, which is incorporated herein by reference.

Figure 1:
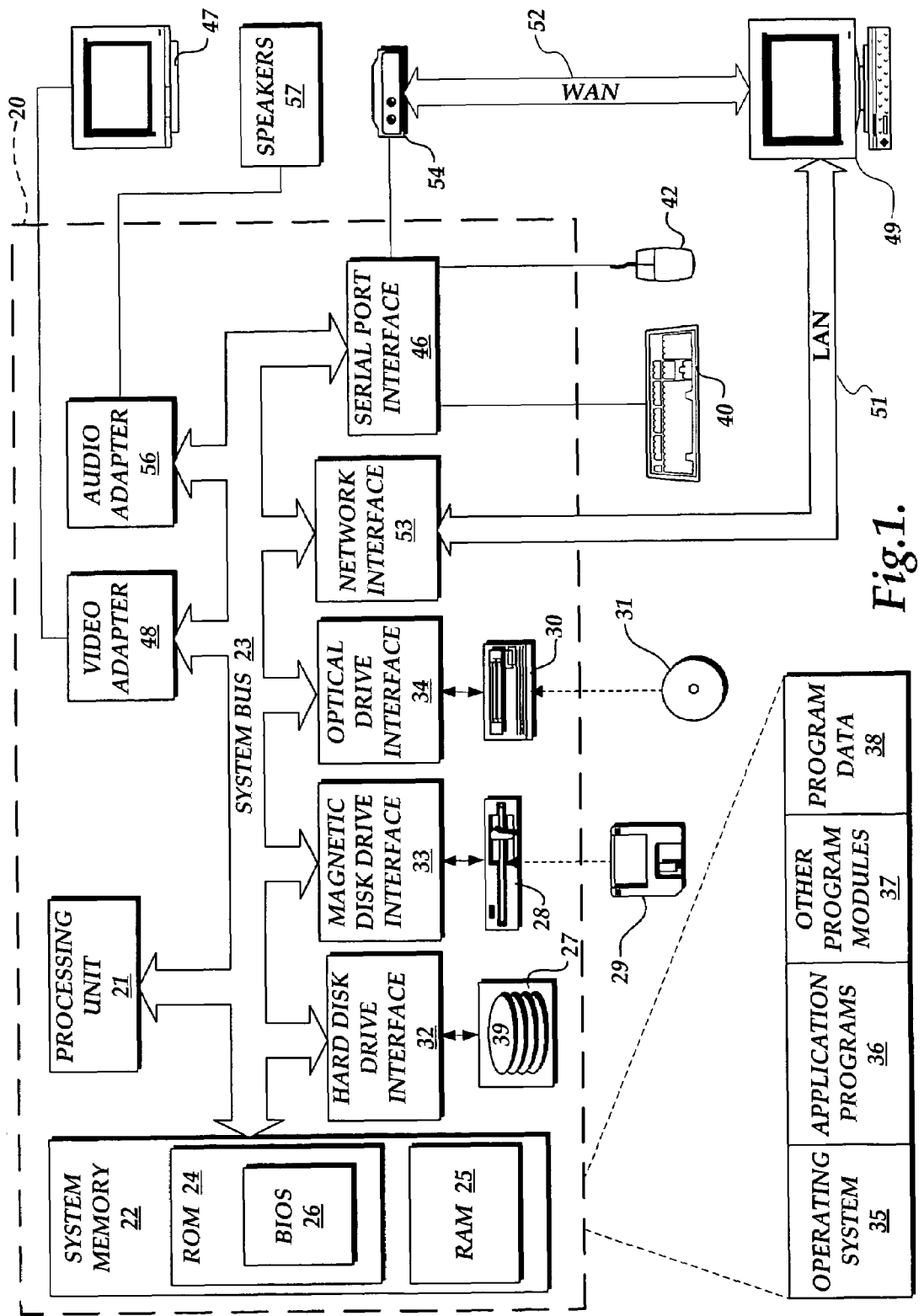
FIG. 1 is a block diagram of a computer suitable for providing an exemplary operating environment for the present invention.

Briefly described, the invention determines if a window is redirected, and, if the window has been redirected, redirecting input messages received from input devices so as to correspond to the actual location of the window object maintained by the operating system. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is best described by reference to FIGS. 2-6B, which graphically illustrate one embodiment of the present invention. FIGS. 2-5 illustrate the logic performed when a window has been redirected. FIGS. 6A-6B are screen displays providing graphical examples of both a redirected window in a three-dimensional environment and a redirected window as actually maintained by the system.

Figure 2:
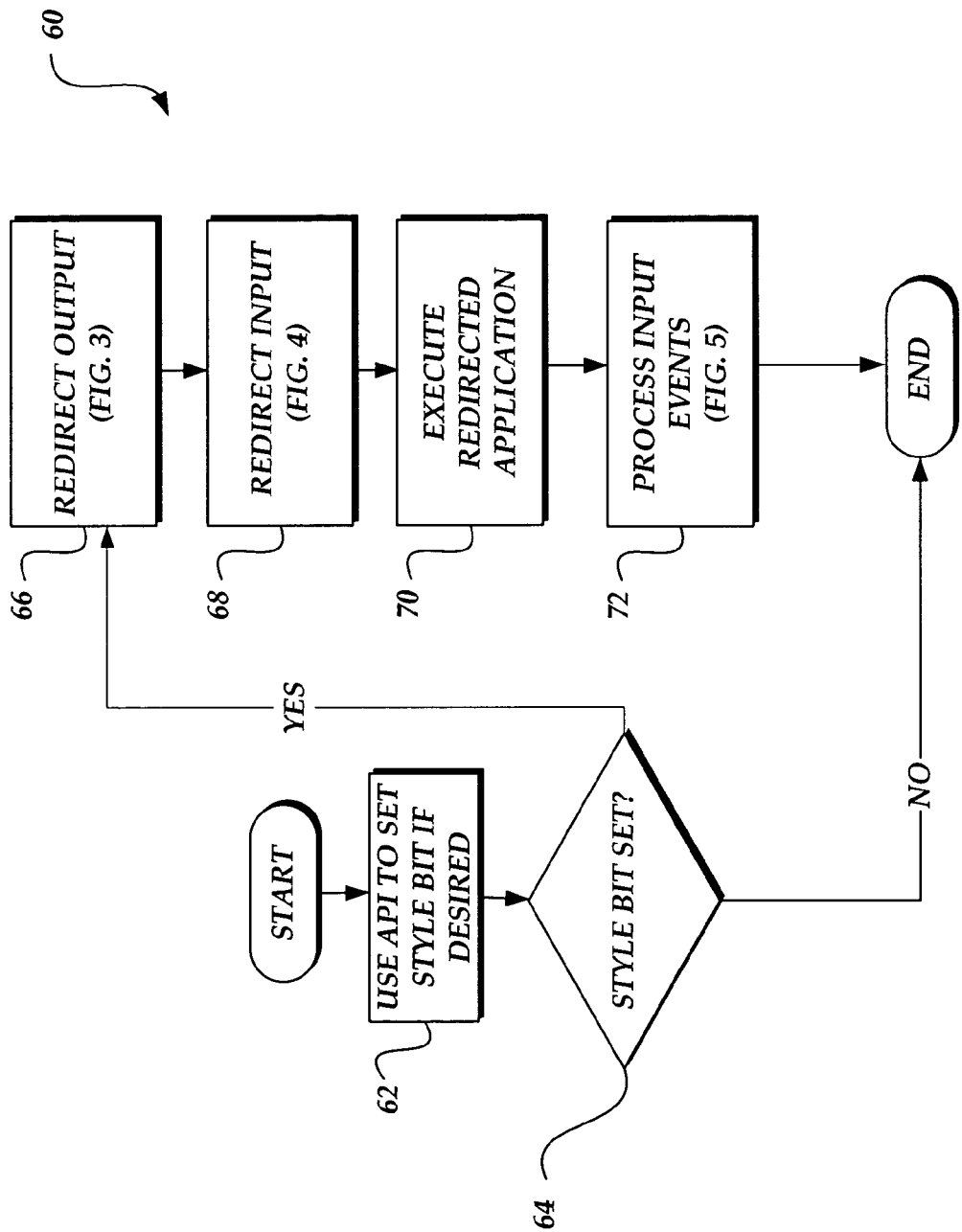
FIG. 2 is an overview flow diagram illustrating redirection.

FIG. 2 is a flow chart illustrating an overview of the present invention. As indicated by block 62, after starting an application, the application programmer's interface (API) may be used to set a style bit indicating that a window should be redirected. In one actual embodiment of the invention, a flag referred to as the WS_EX_REDIRECTED flag within the Windows operating system, is set through the API to redirect the window. As will be appreciated by those of ordinary skill in the art, some other indicator may be used to indicate that the window has been redirected. For example, a different indicator may be used in a different windows system, such as under the X Windows system. The application setting the style bit to redirect the window is referred to as the redirection host. The WS_EX_REDIRECTED flag, or other chosen flag, can be set any time after a windows creation by the redirection host, and when set, results in the transformation of that window into a redirected window. In one actual embodiment, a texture map of a window is created and displayed within a three-dimensional shell. Next, at decision block 64, the style bit is checked to determine if it has been set. In one actual embodiment of the invention, the operating system determines if the style bit, or some other indicator, has been set to determine if the window has been redirected. If the style bit has not been set, the application runs normally. Otherwise, as indicated by block 66, the output is redirected (See FIG. 3). Generally, if the style bit is set, the graphics device interface (GDI) visually removes the window from the desktop, creates an offscreen bitmap, and reroutes all further drawing operations applied to the window to the redirected location. Since the redirected window is not aware of this change, the redirection host is responsible for propagating changes in the application's visible appearance to the screen. To enable this, the GDI provides a global event (redirected paint) whenever the application has finished a visual update. Next, block 68 illustrates that if the style bit has been set, input messages are redirected if the input messages are directed toward the redirected window (See FIG. 4). After the output and input have been redirected, block 70, as shown by the redirected application is executed. Next, as indicated by block 72, as the redirected application is executing, input messages are processed in order to redirect them if needed. Once the application has completed executing, the program terminates. As will be appreciated by those of ordinary skill in the art, applications that have had window(s) redirected do not have to be recompiled in order to work in the redirected environment. Additionally, while examples are provided utilizing the Windows operating system, those of ordinary skill in the art will appreciate that this invention is not limited to the Windows operating system. For example, any windows operating system, such as the X Window system, could implement embodiments of the invention. Additionally, other windowing systems can be modified in order to practice the invention.

Figure 3:
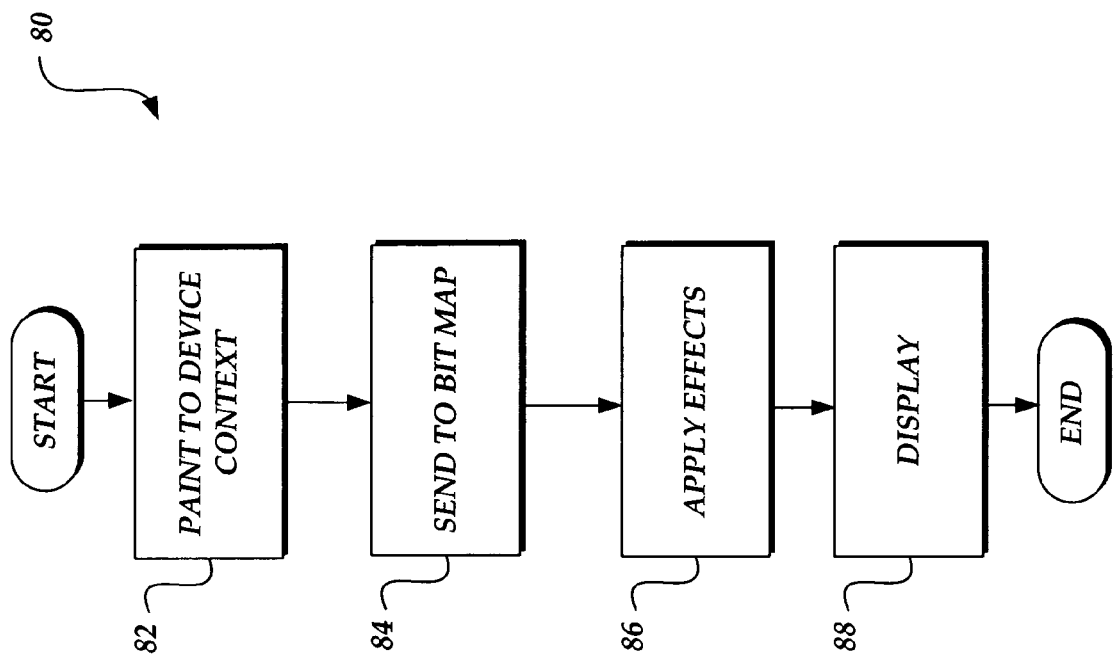
FIG. 3 is a flow diagram illustrating one embodiment of output redirection.

FIG. 3 is a flow diagram illustrating one actual embodiment of output redirection. Once the WS_EX_REDIRECTED flag has been set, the graphics device interface (GDI) visually removes the window from the desktop, creates an off-screen bitmap, and routes all further drawing operations applied to the window to the redirected location. The bitmap can then be accessed to create a texture map of the redirected output. For example, in one actual embodiment, the window is redirected to a 3D environment. This allows virtually limitless possibilities on how to redirect an application. For example, the window could be redirected to a 3D environment, a spherical environment, the window could be directed to appear as an animation, or many other possibilities. Since the redirected application may not be aware of this redirection change, the redirection host is generally responsible for propagating changes in the window's visible appearance to the screen. As will be appreciated by those of ordinary skill in the art, another application may be responsible for propagating changes in the window's visible appearance to the screen. For example, the operating system could propagate the changes. In one actual embodiment of the invention, the GDI provides a global event (redirected paint) when the application has finished a visual update. If the redirection host, or other application, requests a hook on this event, the application obtains a notification of the visual update, including which window was updated and the affected region within the window. Similarly, in order for the redirected output to behave as though it is the actual application the input messages directed to toward the redirected output should be redirected to correspond to the actual location of the window object.

Turning now to FIG. 3 in detail, as discussed above, once the flag is set to have the output redirected, block 82 indicates that the application paints to the device context. See block 82. Next, as block 84 indicates, the information is then sent to a bitmap. Once the information has been painted to the device context, effects may be applied (block 86), to the bitmap before it is displayed (block 88). As will be appreciated by those of ordinary skill in the art, many different effects can be applied to the output. For example, certain pixels could change colors, become elongated, be warped, or any other visual effect could be applied to the pixels. Another example would be to create a three-dimensional display.

Figure 4:
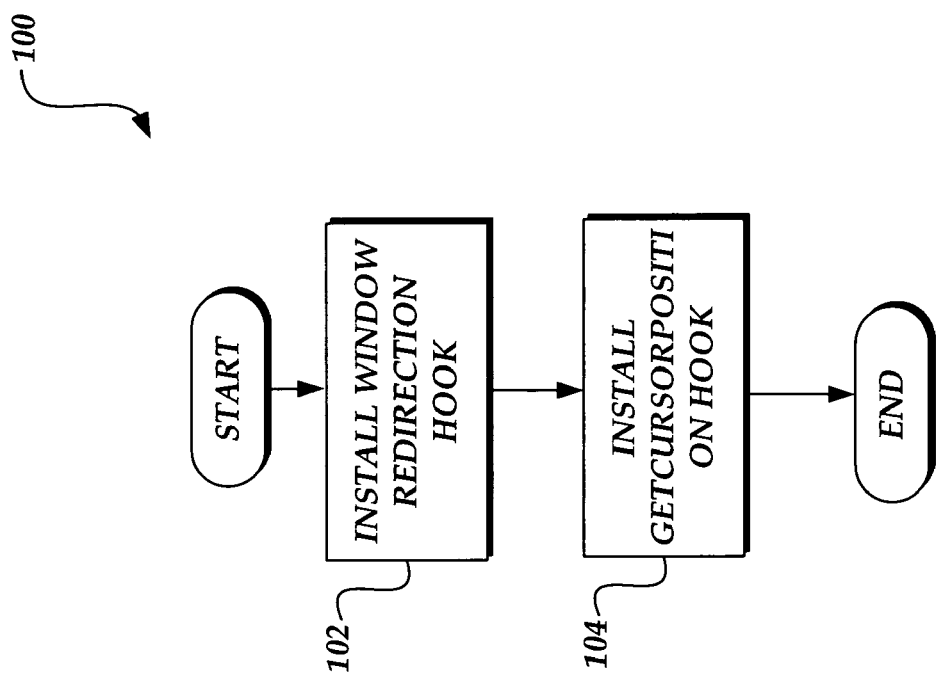
FIG. 4 is a flow diagram illustrating installation of redirection hooks.

FIG. 4 is a flow diagram illustrating how input messages are redirected. In one actual embodiment of the invention, hooks are used to intercept input messages in order for the graphical image to appear to the user as though it is the actual window object of the redirected application. As will be appreciated by those of ordinary skill in the art, other methods of intercepting input messages could be used so long as the input messages can be directed to correspond to the actual location of the live application. For example, the redirection host can examine each event, decide which window the event is directed toward, and report the event to the appropriate window's event queue. This example, however, results in the input message being posted multiple times to different queues. If input messages are not intercepted, the redirection host receives all of the input messages directed over the redirection host's window, since the user is actually interacting with the redirection host and not the redirected window. Initially, as block 102 indicates, if an application has been redirected, a window redirection hook will be installed to redirect input messages obtained from various input devices. These input messages can include many different devices, such as: mice; trackballs; joysticks; touchpads; keyboards; voice input devices; and the like. In one actual embodiment, the input messages intercepted, or "hooked," are input messages received from a user's mouse device. Mouse messages are hooked and adjusted in two different situations. First, when the hit test result is adjusted, and second, when a redirected application inquires about the mouse position directly (See discussion for Block 104). In windows operating systems, mouse messages typically are routed to the window located underneath the position of the cursor. Therefore, in one actual embodiment of the invention, the WH_HITTEST message contained within the Windows operating system, is hooked in order to intercept the input message before it is sent to the target window. Whenever the cursor is located over the window of the redirection host the WH_HITTEST messages are examined. If the pointer is located on a pixel that is part of a redirected window's texture map, the mouse coordinates and target window handle are adjusted in the hit test structure. The hit test structure is adjusted such that the cursor appears to the redirected application as being in the proper location over the redirected window. Once the hit test structure is modified the operating system posts the message to the correct application and with the desired coordinates. In one actual embodiment of the invention, the redirected window is displayed in a three-dimensional (3D) environment (See FIG. 6A). In one actual embodiment, deciding whether the pointer is over a pixel belonging to a redirected window in a 3D environment consists of implementing a 3D hit test using hierarchical bounding boxes which returns a two-dimensional (2D) normalized coordinate on the face of the bounding box that was hit. The normalized 2D coordinate is converted to a 2D mouse coordinate by converting the 2D coordinate into an appropriate pixel coordinate system. As will be appreciated by those of ordinary skill in the art, any transformation can be applied. For example, instead of redirecting the window to a 3D scene, the window could be redirected to spherical scene. If directed to spherical coordinates the transformations used would correspond to standard spherical geometry.

In one actual embodiment of the present invention, each low-level mouse messages generated is inspected. In this embodiment, however, only the active application is tested. This allows the impact on system responsiveness due to current system responsiveness to be minimal. As will be appreciated by those of ordinary skill in the art, all or some of the applications can be tested at any time. In this actual embodiment, the window may be transformed arbitrarily within the scene, and they do not have to be camera-aligned. As will be appreciated by those of ordinary skill in the art, this inspection could occur many different ways. For example, a map of screen locations of transformed 3D objects representing windows could be maintained. A simple point-in-polygon test can then be used to determine whether the mouse pointer is over a particular window. Additionally, by inverting and caching the 3D camera transform, the transformation to 2D forged coordinates is much less computationally expensive as compare to the ray-plane intersection currently used against the bounding boxes.

Block 104 indicates that a GetCursorPosition hook is installed. The GetCursorPosition hook is installed for the situations where an application that has had a window redirected directly inquires for the location of the cursor. By hooking the direct inquiry, the cursor location can be updated, if needed, before the application receives the cursor data. In one actual embodiment of the present invention, applications running under Windows, request this information through the Win32 API call GetCursorPos( ). If the redirected application inquires about the mouse position directly, the cursor position may need to be updated to correspond to the transformed location of the actual window object as compared to the redirected texture map the user sees on the screen. For example, the user may open a menu by locating the mouse pointer over a graphical menu and selecting the menu in a texture map representing the redirected window. As long as the mouse pointer remains over the menu, the menu will be visible. If the mouse pointer is moved outside of the menu's boundaries, however, the menu may disappear because the application assumes that the user is no longer interested in the menu. An application may directly inquire the cursor position when a menu is opened in one of its windows. If an application that has a redirected window makes this inquiry, however, it is likely that the position of the mouse pointer returned will not be within the menu boundaries causing the application to close the menu. Therefore, by installing a hook in GetCursorPos( ), the mouse pointer position can be adjusted before the value is returned to the application when calling GetCursorPos( ).

In one actual embodiment of the invention the redirection host never intercepts keyboard messages. Rather, the keyboard messages are sent to the foreground application by the operating system. As a result, the redirection environment maintains the general Windows policies of window activation and keyboard focus. Typically, under Windows, when a user clicks on a window object, the application receiving the click receives activation and focus. Therefore, to ensure that the redirection host does not become foreground activated the WS_EX_NOACTIVATE flag in the Windows API is set by the redirection host. After the flag has been set, when a user selects a redirected window that window's application will become the foreground window instead of the redirection host. Since the application has become the foreground application, keyboard messages are automatically routed by the operating system to the redirected application. In this actual embodiment, neither mouse nor keyboard messages ever reach the host's window event queue. As will be appreciated by those of ordinary skill in the art, this could be implemented in any window system, such as X Windows.

Figure 5:
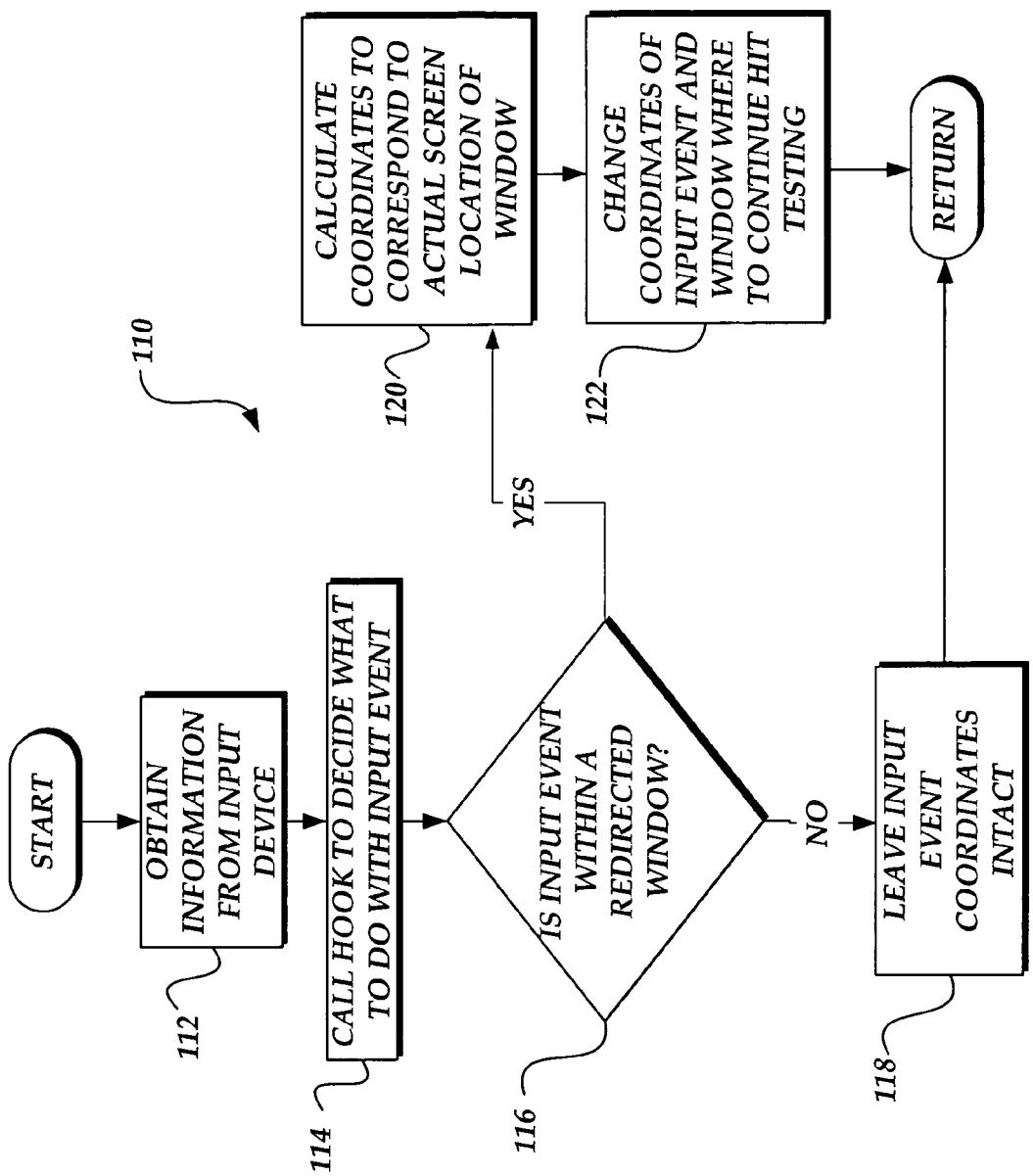
FIG. 5 is a flow diagram illustrating one embodiment how messages from input devices are redirected.
Figure 6A:
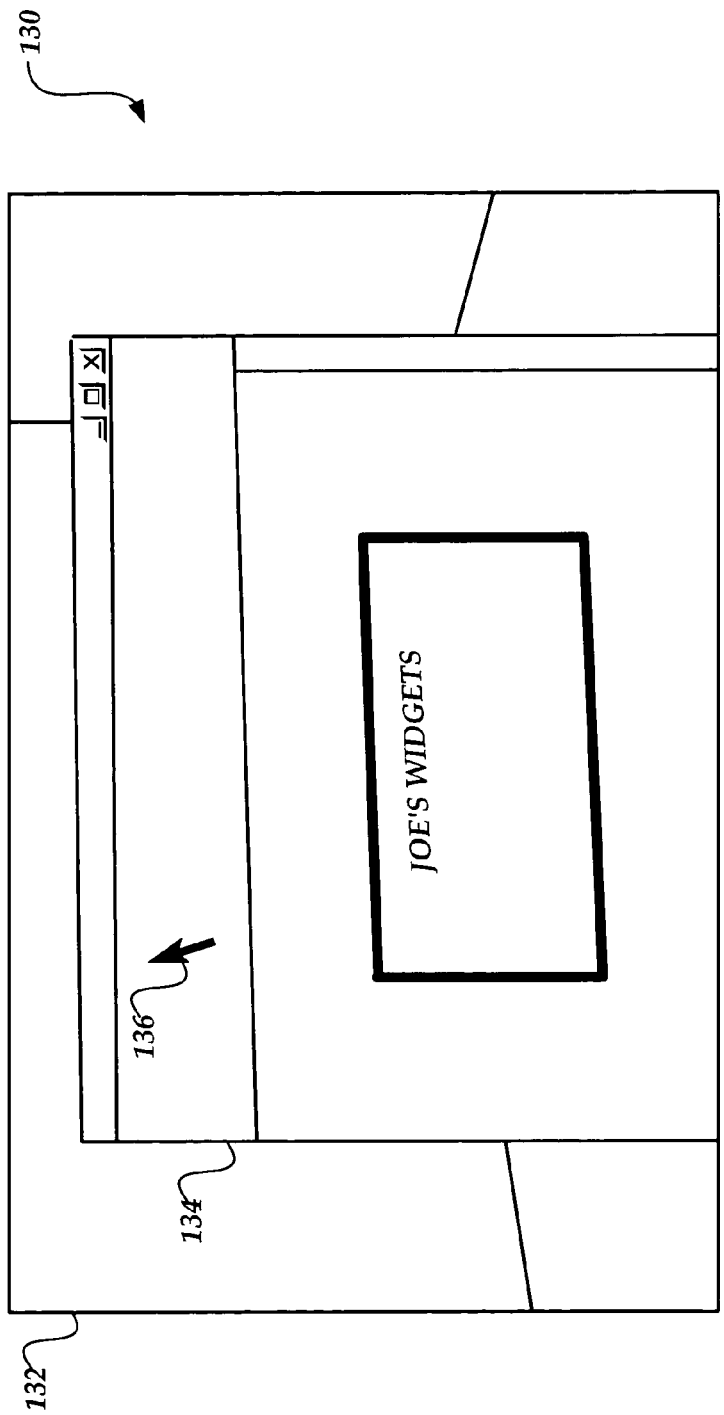
FIG. 6A is an example of a window that has been output redirected.
Figure 6B:
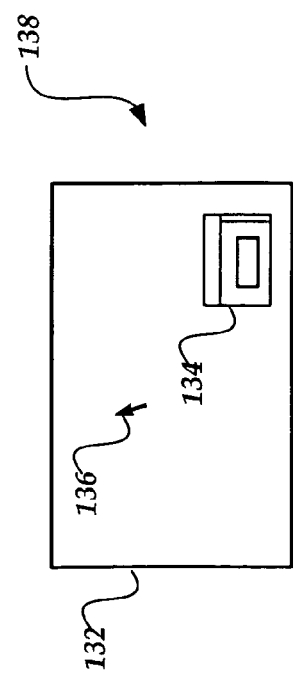
FIG. 6B is an example of how the window that has been redirected as shown in FIG. 5 is actually maintained by the operating system in one embodiment.

FIG. 5 is a flow diagram illustrating how input messages from input devices are redirected in one actual embodiment of the invention. Initially, as indicated by block 112, the operating system obtains information from the input device. As will be appreciated by those of ordinary skill in the art, the information from the input device could also be received directly by the application. When an application has been redirected, as illustrated next by block 114, a hook is called to decide how to process the input event. In one actual embodiment of the invention, the operating system determines where to route the input message depending on whether the input message is directed at the redirected application. As discussed above, the redirection host can also decide where to route the input message. Next, at decision block 116, the operating system determines if the input event occurred within a window that has been redirected. If the input event did not occur within a redirected window, as block 118 indicates, the input event coordinates are left intact with no changes made. If the input event occurred within a redirected window, as block 120 indicates, transformed mouse coordinates are calculated to correspond to the actual screen location of the redirected window. For example, the transformation in a two dimensional space consists of changing the x and y coordinates of the mouse position to correspond to the actual x and y location of the actual position of the window object. Once the mouse coordinates have been transformed, as block 122 indicates, the coordinates of the input event and window are changed in order to continue hit testing.

An example will further clarify how one embodiment of the present invention works. FIGS. 6A-6B illustrate an example of one actual embodiment of the present invention. Specifically, FIG. 6A is an example of a window that has been redirected into a 3D environment. Similarly, FIG. 6B is an example screen layout of the how the application that has been redirected, as shown in FIG. 6A, is actually maintained by the operating system. Referring to FIG. 6A, a 3D environment, 130 represents the view the user sees on the desktop of the computer. The desktop 132, in FIG. 6A, is displayed as a room in this actual embodiment. As will be appreciated by those of ordinary skill in the art there are limitless ways that a redirected window can be displayed. For example, the window could be redirected to being located on a sphere, a cube, placed within a four dimensional environment, or the like. In this example, a window 134 has been redirected to appear three-dimensionally within the 3D environment 130. In this example, a keyboard and a pointer 136 are used to input messages into the redirected window. While FIG. 6A represents what the user actually sees on the computer screen, the actual scene displayed or held on the system is represented by two-dimensional environment 138. The 2D environment 138 is a standard desktop as maintained in many window systems, such as Windows 98, Windows NT, or X Windows. As can be seen by referring to FIG. 6B, window 134 is located in the lower right hand corner of the actual desktop environment. In desktop 138, a mouse pointer, i.e., a cursor 136 is located outside of the boundaries of a window. Referring to the redirected representation of the window 134 in the 3D environment 130, the cursor as seen by the user is actually located within the boundaries of the window 134. Without input redirection, if the user clicked the cursor 136 in FIG. 6B, it would not interact with window 134. But in this example, mouse input messages will be directed to window 134 as long as the cursor appears to be located over window 134 in FIG. 6A. Similarly, when the window 134 requests mouse coordinates directly, the mouse coordinates are updated before being received by window 134.

While the preferred embodiment of the invention has been illustrated and described, it will be appreciated that various changes can be made therein without departing from the spirit and scope of the invention.

The invention claimed is:

1. A method of redirecting an input message to a redirected application on a computing device, the redirected application having at least one of its windows redirected, the redirected window represented on a display of the same computing device as a texture map image, comprising:
   (a) determining if an input message directed toward the texture map image is directed at a redirected application having at least one of its windows redirected ("redirected application");
   (b) intercepting the input message if directed at the redirected application;
   (c) if required, transforming the input message to correspond to the display location of the application window, represented by the texture map image, that has been redirected if the input message is directed at the redirected application by:
      (i) obtaining the display location of the input message;
      (ii) obtaining the display location of the texture map image that represents the application window that has been redirected;
      (iii) creating a transform to change the display location of the input message to the display location of the texture map image that represents the application window that has been redirected if required; and
      (iv) applying the transform to the input message; and
   (d) redirecting the input message to the redirected application if the input message is directed at the redirected application.

2. The method of claim 1, wherein determining if the input message directed toward the texture map image is directed at a redirected application having at least one of its windows redirected ("redirected application") comprises:
   (i) checking an indicator that indicates if a window of an application has been redirected; and
   (ii) determining if the input message occurred over the texture map image that represents a window of the redirected application if the indicator indicates that an application has been redirected.

3. A method of redirecting input messages meant for a redirected application on a computing device, the redirected application having at least one of its windows redirected, the redirected window represented on a display device of the computing device as a texture map image, comprising:

(a) installing at least one hook to intercept input messages;
(b) receiving input messages intercepted by the hook;
(c) determining if the input messages directed toward the texture map image are directed at said at least one redirected window of the redirected application;
(d) if required, transforming the input messages to correspond to the display location of said at least one window of the redirected application represented by the texture map image by:
 (i) obtaining the display location of an input message to be transformed;
 (ii) obtaining the display location of the texture map image that represents the application window that has been redirected;
 (iii) creating a transform to change the display location of the input message to the display location of the texture map image that represents the application window that has been redirected if required; and
 (iv) applying the transform to the input message; and
(e) sending the input message to the redirected application.

4. A computer-readable medium having computer executable instructions for redirecting an input message to a redirected application on a computing device, the redirected application having at least one of its windows redirected, the redirected window represented on a display of the same computing device as a texture map image that, when executed, comprises:

(a) determining if an input message directed toward the texture map image is directed at a redirected application having at least one of its windows redirected ("redirected application");
(b) intercepting the input message if directed at the redirected application;
(c) if required, transforming the input message to correspond to the display location of the application window, represented by the texture map image, that has been redirected if the input message is directed at the redirected application by:
 (i) obtaining the display location of the input message;
 (ii) obtaining the display location of the texture map image that represents the application window that has been redirected;
 (iii) creating a transform to change the display location of the input message to the display location of the texture map image that represents the application window that has been redirected if required; and
 (iv) applying the transform to the input message; and
(d) redirecting the input message to the redirected application if the input message is directed at the redirected application.

5. The computer-readable medium of claim 4, wherein determining if the input message directed toward the texture map image is directed at a redirected application having at least one of its windows redirected ("redirected application") comprises:
 (i) checking an indicator that indicates if a window of an application has been redirected; and
 (ii) determining if the input message occurred over the texture map image that represents a window of the redirected application if the indicator indicates that an application has been redirected.

6. A computer-readable medium having computer-executable instructions for redirecting input messages meant for a redirected application on a computing device, the redirected application having at least one of its windows redirected, the redirected window represented on a display of the same computing device as a texture map image that, when executed, comprises:

(a) installing at least one hook to intercept input messages;
(b) receiving input messages intercepted by the hook;
(c) determining if the input messages directed toward the texture map image are directed at said at least one window of the redirected application;
(d) if required, transforming the input messages to correspond to the actual display location of said at least one window of the redirected application represented by the texture map image by:
 (i) obtaining the display location of the input message;
 (ii) obtaining the display location of the texture map image that represents the application window that has been redirected;
 (iii) creating a transform to change the display location of the input message to the display location of the texture map image that represents the application window that has been redirected if required; and
 (iv) applying the transform to the input message; and
(e) sending the input message to the redirected application.

7. A computer system including a processor for redirecting an input message to a redirected application on a computing device, the redirected application having at least one of its windows redirected, the redirected window represented on a display of the same computing device as a texture map image, wherein the computer system is capable of running an application having a plurality of executable steps, the method comprising:

(a) determining if an input message directed toward the texture map image is directed at a redirected application having at least one of its windows redirected ("redirected application");
(b) intercepting the input message if directed at the redirected application;
(c) if required, transforming the input message to correspond to the display location of the application window, represented by the texture map image, that has been redirected if the input message is directed at the redirected application by:
 (i) obtaining the display location of the input message;
 (ii) obtaining the display location of the texture map image that represents the application window that has been redirected;
 (iii) creating a transform to change the display location of the input message to the display location of the texture map image that represents the application window that has been redirected if required; and
 (iv) applying the transform to the input message; and
(d) redirecting the input message to the redirected application if the input message is directed at the redirected application.

8. The computer system of claim 7, wherein determining if the input message directed toward the texture map image is directed at a redirected application having at least one of its windows redirected ("redirected application") comprises:
 (i) checking an indicator that indicates if a window of an application has been redirected; and
 (ii) determining if the input message occurred over the texture map image that represents a window of the redirected application if the indicator indicates that an application has been redirected.

9. A computer system including a processor for redirecting an input message to a redirected application on a computing device, the redirected application having at least one of its windows redirected, the redirected window represented on a display of the same computing device as a texture map image, wherein the computer system is capable of running an application having a plurality of executable instructions that when executed comprise:
  (a) installing at least one hook to intercept input messages;
  (b) receiving input messages intercepted by the hook;
  (c) determining if the input messages directed toward the texture map image are directed at said at least one window of the redirected application represented by the texture map image;
  (d) transforming the input messages to correspond to the display location of said at least one window of the redirected application represented by the texture map image by:
    (i) obtaining the display location of the input message;
    (ii) obtaining the display location of the texture map image that represents the application window that has been redirected;
    (iii) creating a transform to change the display location of the input message to the display location of the texture map image that represents the application window that has been redirected if required; and
    (iv) applying the transform to the input message; and
  (e) sending the redirected input message to the redirected application.

* * * * *